July 29, 1952 P. F. DE MESQUITA 2,604,699
LEVEL AND DISTANCE METER
Filed March 14, 1949 2 SHEETS—SHEET 1
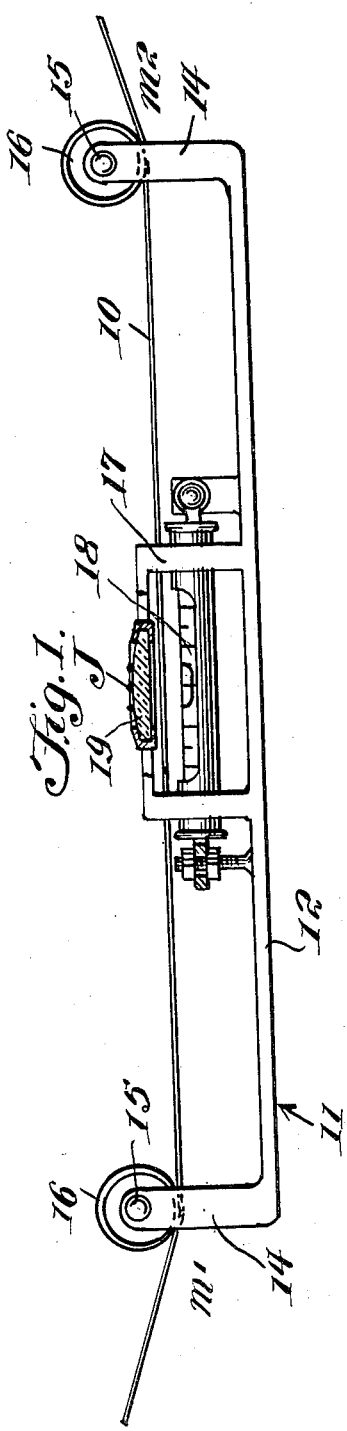
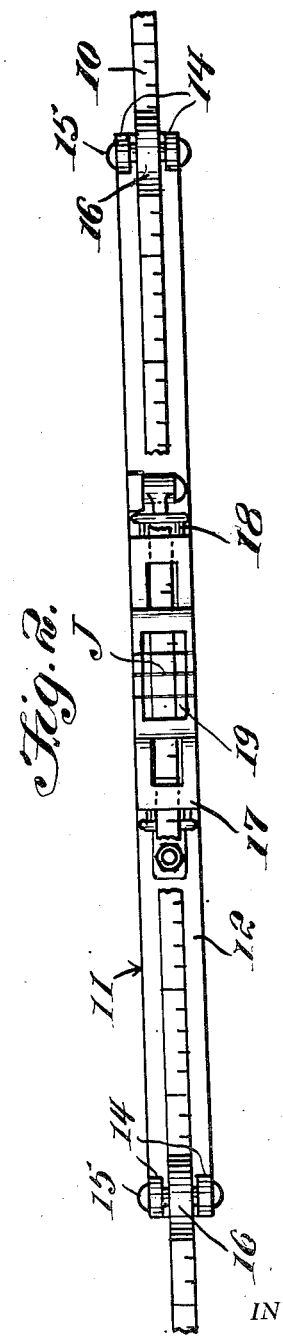
INVENTOR.
Paulo Ferraz de Mesquita,
BY Victor J. Evans & Co.
ATTORNEYS

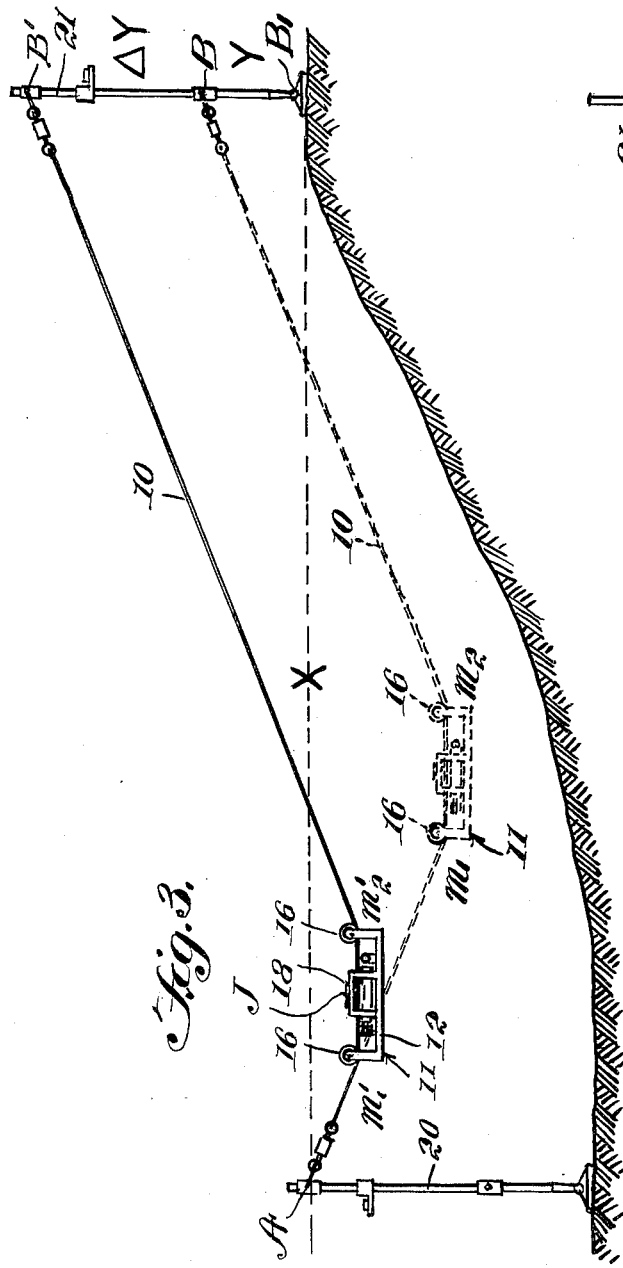
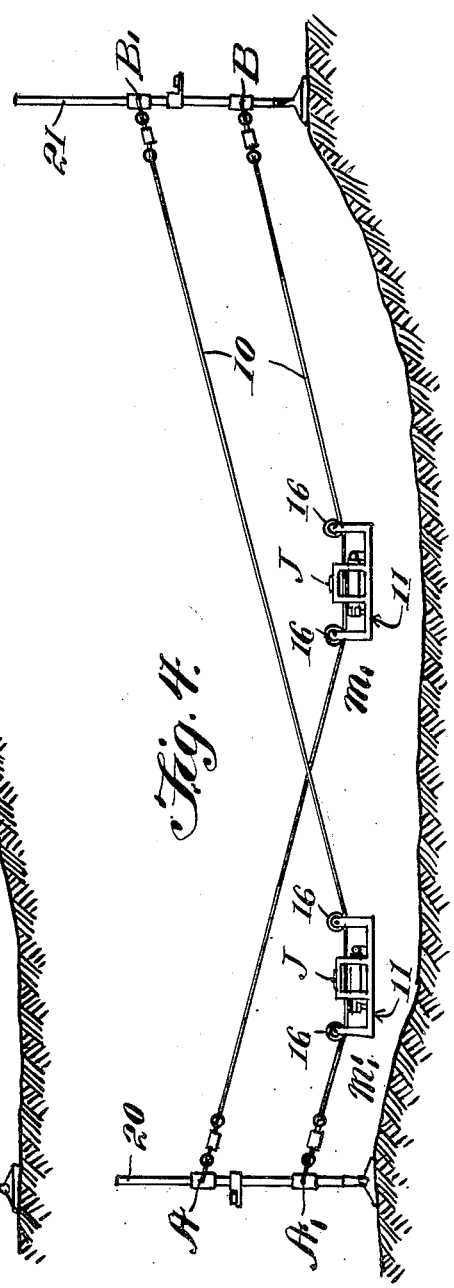

Patented July 29, 1952

2,604,699

UNITED STATES PATENT OFFICE 2,604,699

LEVEL AND DISTANCE METER

Paulo Ferraz de Mesquita, Sao Paulo, Brazil

Application March 14, 1949, Serial No. 81,277
In Brazil June 12, 1948

1 Claim. (Cl. 33—125)

This invention relates to an instrument for use in ascertaining the difference in level or elevation between any two given points, the instrument of the present invention operating under the action of gravity.

The object of the invention is to provide an instrument whose operation can be readily mastered by persons who are not skilled in higher mathematics; the instrument of the present invention including a band or wire that is suspended between two points; the instrument of the present invention enabling a person to accurately determine the distance and difference of level between two points.

A further object of the invention is to provide an instrument which is extremely simple and inexpensive to manufacture.

Other objects and advantages will be apparent during the course of the following description and disclosure.

In the accompanying drawings, forming a part of this application, and in which like numerals are used to designate like parts throughout the same:

Figure 1 is a side elevational view of the instrument of the present invention.

Figure 2 is a top plan view of the instrument of Figure 1.

Figures 3 and 4 are side elevational views illustrating the invention being used.

Referring in detail to the drawings, the numeral 10 designates a calibrated line or wire which is flexible, and mounted for travel along the line 10 is a body member 11. The body member 11 includes an elongated base 12.

Extending upwardly from each end of the base 12 or formed integrally therewith, or secured thereto, is a pair of spaced parallel ears 14. The ears 14 are arranged in pairs and are provided with registering apertures or openings. A pin 15 extends through these registering apertures, and a rotatable wheel 16 is mounted on each of the pins 15 for engagement with the calibrated line 10, whereby the body member may travel along the calibrated line under the action of gravity.

Arranged intermediate the ends of the base and secured thereto is a bracket 17. A spirit level 18 extends longitudinally through the bracket 17 and is supported therein. A transparent viewing member 19 is arranged above the spirit level 18 so as to enable the user to readily observe the spirit level. Suitable vertically disposed uprights 20 or standards 20 and 21 are provided for adjustably supporting bushings which are connected to the ends of wire 10.

From the foregoing, it is apparent that an instrument has been provided that can be used for measuring distances and differences of level. The instrument operates under the action of gravity and moves to the lowest point of the graduated band or wire which is suspended between the standards 20 and 21. The spirit level 18 indicates when the instrument is in a horizontal position and the two standards 20 and 21 may be arranged at different levels as shown in Figures 3 and 4. The instrument will have a tendency to assume a stationary position at the position of equilibrium and the instrument can be used for determining the horizontal distance indicated by the dotted line X in Figure 3 as well as the difference in level Y between the two points A and B. Referring to Figure 3 of the drawings, a practical example of the use of the instrument is illustrated. Let A and B (Fig. 3) be two points whose distance $X=AB_1$ and difference of level $Y=B_1B$ are to be determined. First, the calibrated band 10 has one of its ends fastened to the upright 20 at point A and its other end fastened at point B to upright 21, the band 10 having a known length, as for example 10,000 millimeters. Then, the instrument is moved along the band 10 under the action of gravity and the body member 11 will reach the lowest interval or position on the band which will be the equilibrium position. The spirit level 18 will enable the user to ascertain when the instrument is in a steady horizontal position. Assuming that point $m_1=4700-250=4450$ mm., the value of 4700 mm. being read under the index J and the value of 250 mm. representing the known length between the point $m_1$ and the index J. It will then be seen that the reading 4450 mm. represents the length $Am_1$ that extends along the band from A to $m_1$. Next, one end of the band is raised a predetermined level such as the distance $\Delta Y$, and the end of the band 10 is made fast at point B'. The gage then travels along the band 10 until it reaches its lowest or equilibrium position and after the bubble of the spirit level has settled, the new reading $m_1'$ is determined. For example, let $m_1'=3100-250=2850$ mm., this being the new reading made by means of the same index J. These two readings of $m_1$ and $m_1'$, obtained as described above, can be used with a calibrated chart or table to obtain the horizontal distance X and the difference of level Y between the two points A and B.

Referring to Figure 4 of the drawings, there is shown another use of the assembly of the present invention. Here two uprights 20 and 21 are used and slidably mounted on these uprights are sleeves that have the end of the band 10 connected thereto. In use, the uprights 20 and 21 are arranged in a vertical position and the body member 11 travels along the band 10 under its own weight, until it assumes an equilibrium position, the equilibrium position being ascertained by the spirit level 18. First a reading at point $m_1$ is made by using the index J, and then the end of the band 10 is raised from point B to point $B_1$. The other end of the band is moved from A to $A_1$ and the body member 11 again travels along the band 10 and a second reading $m_1'$ is obtained. By means of the two readings $m_1$ and $m_1'$, and by means of suitably calibrated tables, the difference of level between point A and point B, as well as the horizontal distance, can be ascertained.

I claim:

In an apparatus for simultaneously measuring the distance and difference of level between two given points, a calibrated line, a body member, said body member embodying an elongated base, a pair of wheels rotatably connected to said base for engagement with the calibrated line whereby the body member may travel along the calibrated line under the action of gravity, a bracket arranged intermediate the ends of said base and secured thereto, a spirit level extending longitudinally through said bracket and supported therein, the upper surface of said base being provided with a plurality of graduations thereon.

PAULO FERRAZ DE MESQUITA.

REFERENCES CITED

The following references are of record in the file of this patent:

UNITED STATES PATENTS

| Number | Name | Date |
|---|---|---|
| 360,247 | Reichenbach | Mar. 29, 1887 |
| 2,268,758 | Martin | Jan. 6, 1942 |